United States Patent
Döring

(10) Patent No.: US 11,147,283 B2
(45) Date of Patent: Oct. 19, 2021

(54) BUTTER

(71) Applicant: DMK Deutsches Milchkontor GmbH, Zeven (DE)

(72) Inventor: Sven-Rainer Döring, Zeven (DE)

(73) Assignee: DMK Deutsches Milchkontor GmbH, Zeven (DE)

( * ) Notice: Subject to any disclaimer, the term of this patent is extended or adjusted under 35 U.S.C. 154(b) by 477 days.

(21) Appl. No.: 15/993,924

(22) Filed: May 31, 2018

(65) Prior Publication Data

US 2019/0008177 A1    Jan. 10, 2019

(30) Foreign Application Priority Data

Jul. 10, 2017    (EP) .................................... 17180618

(51) Int. Cl.
| | | |
|---|---|---|
| A23C 15/12 | (2006.01) | |
| A21D 13/16 | (2017.01) | |
| A21D 2/16 | (2006.01) | |

(52) U.S. Cl.
CPC .............. *A23C 15/12* (2013.01); *A21D 2/165* (2013.01); *A21D 13/16* (2017.01)

(58) Field of Classification Search
CPC .................................................... A23C 15/12
See application file for complete search history.

(56) References Cited

U.S. PATENT DOCUMENTS

| | | | |
|---|---|---|---|
| 2,357,896 A | 9/1944 | Howe | |
| 9,532,583 B2* | 1/2017 | Paddock | ................ A23C 15/14 |
| 2007/0298143 A1 | 12/2007 | John | |
| 2014/0120213 A1* | 5/2014 | Miller | ................... A21D 13/17 |
| | | | 426/19 |

FOREIGN PATENT DOCUMENTS

DE    197 07 406 A1    8/1998

OTHER PUBLICATIONS

"Butter through the Ages—What is Butter?". Available online as of Apr. 1, 2013 from www.webexhibits.org/butter/composition.html. p. 1. (Year: 2013).*
Jessica Cheung. The Melting point of butter. Available online as of 2003 from "The Physics Factbook" https://hypertextbook.com/facts/2003/JessicaCheung.shtml. pp. 1-2. (Year: 2003).*
Lilith, "Lemon & Chilli Butter Product Description," Nov. 30, 2015, pp. 1-3.
Lilith, "Porcini Mushroom Butter Product Description," Sep. 30, 2015, pp. 1-4.

* cited by examiner

*Primary Examiner* — Jenna A Watts
(74) *Attorney, Agent, or Firm* — Dilworth & Barrese, LLP

(57) ABSTRACT

A butter is suggested, comprising or consisting of
(a) a first butter phase having a fat content of less than 90% by weight, and
(b) a second butter phase having a fat content of at least 90% by weight.
The butter of the invention gives the baked goods unusual sensory properties.

12 Claims, No Drawings

BUTTER

FIELD OF THE INVENTION

The invention is in the field of dairy products and relates to a new two-phase butter blend, a method for its production, its use in the production of specific baked goods, and the corresponding baked goods.

STATE OF THE ART

Puff pastry and similar products such as croissants or Danish pastry are among the most popular baked goods.

Puff pastry dough (also known to as Pâte feuilletée) is a multi-layer laminated dough. Butter, less commonly also another solid fat such as margarine is incorporated into the basic dough which is composed of flour, salt, and water, by repeated rolling and folding which is referred to as "sheeting".

During the baking process, the dough rises in a light and flaky form. As a result of the heat from baking, the water present in the dough evaporates, allowing the dough to expand such that the baked good rises. The layers of fat act like a barrier in the process; they do not allow the vapour to leave, enclosing it in the layer of dough until the dough structure is baked, reaching a stable state. The rising (increase of volume) of the dough is only caused by the vapour that is created within the dough, and not by any additional leavening agent or yeast. Therefore, this method of production is referred to as "mechanical leavening".

Puff pastry dough is mostly taste-neutral, depending on the natural taste of the fats used, and is produced without the addition of sugar. Therefore it is suitable for both sweet and savoury baked goods.

Puff pastries are distinguished by the way the butter, or the fat, is incorporated into them:

German puff pastry dough: the layers of fat are inside, the basic dough encloses them (according to the Principles for Viennoiseries laid down in the German Guidelines for Food—Deutsches Lebensmittelbuch; it contains at least 62 kilogrammes butter, milkfat products, or margarine, or practically water-free fats, based on 100 kilogrammes cereal products);

French puff pastry dough: the layers of fat enclose the basic dough. The advantage is in that the dough will not dry out or develop a crust, because the layer of fat is outside;

Dutch puff pastry dough: the fat is incorporated into the dough in the form of cubes (in a cool state), the dough is layered without allowing any breaks (therefore it is also called blitz pastry), and is predominantly processed to puff pastry flan cases, as it does not raise that well (on the sides).

Dutch puff pastry dough occupies a special position due to its compact structure, as the baked goods can be cut after baking. Due to their compactness, these doughs are suitable for special types of baked goods such as crumb cake with fruit and a puff pastry base (German: Prasselkuchen), flan cases, and the top of cakes.

It is mostly the dough that determines the differences between puff pastry and other laminated baked goods such as Danish pastry, or also croissants. No yeast is added to puff pastry dough, but yeast is used in Danish pastry as a leavening agent. In addition, the doughs contain sugar, milk, and other ingredients as needed and depending on the recipe. Laminated Yufka dough, Phyllo dough, or Moussaka dough is widely used in the Turkish, Greek, and Arabic cuisine and is very similar to puff pastry dough. Variations using oil and yeast are also known.

It is important that the finished baked good does not taste strongly of butter or fat on the one hand, but that it leaves a buttery impression as a whole, both optically and with respect to the flavour on the other, as consumers consider this to be a sign of quality.

The market segment which includes puff pastries is very homogeneous, barely allowing any product variety. Commercial success is solely based on quality and price. However, consumers are certainly interested in baked goods which exhibit additional sensory or taste properties. These, however, are limited in choice: typically, they are croissants or the like, into which a core of chocolate cream or jam is subsequently injected. In this case, it is essential that the manufacture of the products is virtually exclusively performed automatically, as an alignment of the rolling rollers with millimetre precision is required to produce a homogeneous dough and a qualitatively valuable product after the baking process. Introducing any further ingredients, which also have to survive the baking process, is only suitable for these processes to a very limited degree, if at all.

This particular object is underlying the present invention, i.e., providing baked goods, specifically puff pastry products or corresponding bake-off products which do not contain any further ingredients in addition to the basic dough and butter, but which still exhibit new and unusual sensory or taste properties.

DESCRIPTION OF THE INVENTION

A first subject matter of the invention relates to butter, containing or consisting of
(a) a first butter phase having a fat content of less than 90% by weight, and
(b) a second butter phase having a fat content of at least 90% by weight.

Surprisingly, it was found that butter which is composed of two phases, each having a a different fat content, has significant advantages in comparison with a one-phase standard butter, because different taste or sensory properties are obtained in the ready-to-eat end product, depending on the fat content of the two phases.

Butter Phases

Butter is a spreadable fat, usually made from the cream of milk and consisting of at least 80% milkfat, according to EC regulations. During the butter production process, the cream is agitated. As a result, the fat globules of the milk fat are damaged. The membrane surrounding the fat breaks open and the contained fat leaks out. The fat conjoins, in the process of which parts of the fat membranes, water, and some milk protein are enclosed. The liquid fat-in-water emulsion becomes a solid water-in-fat emulsion. The by far largest of these fat-free components (whey) leaks out as buttermilk. The butter itself is eventually kneaded to form a homogeneous, smooth mass which is subsequently formed and packaged.

Within the meaning of the present invention, the first butter phase preferably has a fat content within the range of about 82 to about 88% by weight, more particularly about 84 to about 86% by weight.

It is also preferred that the second butter phase has a fat content within the range of 90 to about 96% by weight, more particularly about 92 to about 94% by weight.

It is further preferred that the first and/or the second butter phase have a content in fat-free dry matter (FFDM) within the range of 1 to 3% by weight, and preferably about 2% by weight. The amounts of fat and dry matter each add up to 100%, whereby the amount of water must not exceed 16% by weight, otherwise, it will not be a butter according to the EC regulation any more.

The sensory experience of the new butter is mainly influenced by the melting point of the second higher-fat butter phase:

If the second butter phase has a melting point of at least 45° C., and preferably of about 46 to about 50° C., the resulting baked goods are characterised by a firmer bite.

However, if the second butter phase has a melting point of less than 45° C., and preferably of about 36 to about 40° C., a cooling effect appears when the resulting baked goods are consumed.

In order to obtain the desired sensory/taste effect, it is recommended to arrange the two phases in one, two, or more layers on top of one another, wherein the lower-fat phase is preferably at the bottom and the higher-fat phase is at the top. The weight ratio of the two phases may vary between about 20:80 to about 80:20, preferably about 25:75 to about 75:25, and more particularly about 40:60 to 60:40.

The production of the layered butter can particularly be carried out in a continuous process, which comprises, for example, the following steps:

(i) providing a first butter phase (a), (ii) providing a second butter phase (b), (iii) placing the first butter phase (a) planely onto a tray, (iv) placing the second butter phase (b) on top of the first butter phase (a).

Another subject matter of the invention relates to bake-off products, comprising or consisting of (a) a dough phase, and (b) a butter blend, preferably in layered form, as described above.

The dough phase is preferably a standard puff pastry dough, as described above.

A further subject matter of the invention relates to a process for the production of baked goods, preferably croissants, comprising the following steps:

(i) providing a dough phase;

(ii) providing a layered butter, as described above, (iii) placing the layered butter onto the dough phase, obtaining a bake-off product;

(iv) baking the bake-off product.

Alternatively, the bake-off product can be folded repeatedly before baking such that a layered structure is obtained, as it is common for puff pastry dough.

Finally, the present invention also comprises the use of a butter as described above for the production of baked goods, particularly puff pastries, more particularly croissants.

EXAMPLES

Examples 1 and 2, Comparison Example V1

Two butter matrices were produced, having the following composition, in the process of which the two phases were rolled out to have the same thickness, and phase (B) was placed onto phase (A) (Table 1). Phase (A) corresponded to a standard industrially produced butter.

TABLE 1

Butter composition

| Expl. | Phase | Amount [% by weight] | Fat [% by weight] | Temp. [° C.] | FFTM [% by weight] | Water [% by weight] |
|---|---|---|---|---|---|---|
| 1 | A | 50 | 82 |    | 2 | 16 |
|   | B | 50 | 92 | 48 | 2 | 6 |
| 2 | A | 50 | 82 |    | 2 | 16 |
|   | B | 50 | 94 | 38 | 2 | 4 |

The butter matrices were rolled out thinly onto a standard puff pastry dough which was folded five times in total, so that a layered structure was obtained. Subsequently, the bake-off product was baked and sampled by a panel consisting of ten experienced assessors, comparing it with a comparison product in which the buttering of the dough was performed using the same amount of industrially produced butter (example V1). The results are given in Table 2; the evaluation was performed on a scale of (5)=very pronounced, to (1)=barely noticeable.

TABLE 2

Sensory/taste evaluation

| Product | Firmness to the bite | Cooling effect |
|---|---|---|
| 1 | 4.5 | 1.5 |
| 2 | 2.0 | 3.5 |
| V1 | 2.0 | 1.5 |

Both the examples and the comparison example, in fact, show that by using the new two-phase butter a change in the sensory/taste perception is obtained without that any further substances need to be added.

The invention claimed is:

1. A butter, consisting of at least 80 percent milk fat and derived from milk of cows, consisting of
   (a) a first butter phase having a fat content of less than 90% by weight, and
   (b) a second butter phase having a fat content of at least 90% by weight, wherein
   the second butter phase (b) has a melting point of at least 45° C.,
   the two butter phases (a) and (b) are arranged on top of one another in at least two layers,
   the first butter phase (a) is at the bottom and the second butter phase (b) is at the top, and
   the butter phases (a) and (b) are present in the weight ratio of 40:60 to 60:40.

2. The butter of claim 1, wherein the first butter phase has a fat content within the range of about 82 to about 88% by weight.

3. The butter of claim 1, wherein the second butter phase has a fat content within the range of 90 to about 96% by weight.

4. The butter of claim 1, wherein the first and/or the second butter phase has a content of fat-free dry matter within the range of 1 to 3% by weight.

5. The butter of claim 1, wherein the second butter phase has a melting point of 46 to 50° C.

6. A process for the production of the butter of claim 1, comprising the following steps:
   (i) providing a first butter phase (a),
   (ii) providing a second butter phase (b), (iii) placing the first butter phase (a) planely onto a tray, and
(iv) layering the first butter phase (a) onto the second butter phase (b).

7. A bake-off product, comprising
(a) a dough phase, and
(b) the butter of claim 1.

8. The bake-off product of claim 7, wherein the dough phase is a standard puff pastry dough.

9. A process for the production of baked goods, comprising the following steps:
(i) providing a dough phase;
(ii) providing a layered butter of claim 1;
(iii) placing the layered butter onto the dough phase, obtaining a bake-off product; and
(iv) baking the bake-off product.

10. A method for the production of baked goods, comprising using the butter of claim 1.

11. The butter of claim 1, wherein the two-phase butter changes sensory/taste perception without further substances being added.

12. The method of claim 10, wherein the baked goods are puff pastries.

\* \* \* \* \*